United States Patent Office 2,719,828
Patented Oct. 4, 1955

2,719,828

DECONTAMINATING COMPOSITION

James D. MacMahon, Baltimore, Md., assignor to Olin Mathieson Chemical Corporation, a corporation of Virginia No Drawing. Application August 2, 1952,
Serial No. 302,427

6 Claims. (Cl. 252—187)

My invention relates to calcium hypochlorite in the form of a "supertropical bleach" composition which has special utility as a decontaminating agent.

In the decontamination of areas, structures and articles contaminated with mustard gas, so-called tropical and supertropical bleaches have been employed. Tropical bleach is simply a bleaching powder prepared by chlorinating dry hydrated lime in specifically designed equipment and under operating conditions resulting in the production of bleaching powder having a water content under 3 per cent. Supertropical bleach is obtained by admixing sufficient quicklime with the product to convert the water to calcium hydroxide which renders the composition more stable than tropical bleach. Such special preparation is costly due to the specially designed equipment involved. Moreover, in the development of more satisfactory compositions, rigid and numerous specifications have been established by the Army Chemical Corps. Thus, a satisfactory decontamination agent must be useful in dry form and as a slurry. A standard slurry comprising usually 3 parts of water to 2 parts of the solid hypochlorite composition and containing about ½ ounce of citric acid per gallon of water must be effective in decontaminating mustard gas when applied to the contaminated article. The slurry must have sufficient stability to withstand prolonged storage under conditions of high temperature and humidity. The slurry must be quickly and readily prepared and free from solid particles sufficiently large to clog spray nozzles. A minimum temperature rise should occur in the preparation of the slurry. The slurry should not be subject to foaming. It must have a congealing temperature of below —15° C. The viscosity must be as high as possible consistent with sprayability in order to adhere well to vertical surfaces. The viscosity should not increase in 24 hours beyond this point. In addition, it is desirable that the solid composition be effective in decontaminating mustard gas when spread in dry form over contaminated areas. Preferably it should have a bulk density of more than 0.8 and a high degree of stability when stored under tropical climatic conditions and when a thin layer is exposed to sunlight. Although calcium hypochlorite is much more reactive than the tropical bleaches in mustard decontamination, it has not been possible to compound it in a form providing the combination of desired physical properties and reactivity with reasonable product stability.

I have now prepared a composition comprising a commercial high test calcium hypochlorite combined with particular alkalies and inorganic salts in particular proportions that cooperate together to provide the combination of reactivity, alkalinity, stability and physical properties necessary to meet the severe requirements that have been established for a decontaminating agent. My composition comprises about 40 to 45 weight per cent calcium hypochlorite of not less than about 70 per cent available chlorine, about 5 to 12 weight per cent of quicklime, about 1 to 10 weight per cent of hydrated lime, about 20 to 50 weight per cent of a hypochlorite-inert water-insoluble inorganic extender or buffer, e. g. calcium carbonate, about 1 to 10 weight per cent of a water soluble salt of an alkali metal and an anion the calcium salt of which is water insoluble and flocculent in nature, e. g., sodium carbonate, and about 1 to 10 weight per cent of sodium chloride. Each component of the composition is an essential and active ingredient performing specific functions which cooperate to produce the intended result of effective decontamination from slurry or dry state.

The calcium hypochlorite component is the reactive component which converts the mustard gas to relatively innocuous products which, however, are acidic in nature. In addition, the calcium content of the hypochlorite is simultaneously converted to calcium chloride, calcium sulfate and other salts. The calcium hypochlorite is a high test product containing a minimum of 70 per cent available chlorine. This is a commercially manufactured article and is readily available. The particle size of the calcium hypochlorite is particularly important. The portion passing a 60 mesh screen is preferred. This material has the advantage over coarser particle sizes in that it is more effective in the dry form in the deactivation of mustard gas and it also tends to increase the viscosity of the standard slurry.

The quicklime should preferably contain not less than about 93 per cent active calcium oxide and is also preferably divided so that at least 95 per cent will pass a 325 mesh screen. The desiccating action of the quicklime increases the wettability of the composition and supplies part of the alkalinity required to neutralize the acidic decomposition products of mustard gas. The proportion of quicklime should not be below about 5 weight per cent in order to dehydrate the mixture effectively and provide adequate stability. It should not exceed about 12 weight per cent as larger amounts appear to interfere with the deactivation when the dry form is used and also increase the temperature rise in the preparation of the slurry. The proportion of quicklime within these limits depends on the moisture content of the individual components and therefore of the mixture aside from the quicklime. Calculations of suitable proportions may be based on the conversion of calcium oxide to calcium hydroxide.

All of the alkalinity required to neutralize the decontamination products cannot be supplied by quicklime because the heat evolved on making up the slurry would then be excessive. Hydrated lime, therefore, is used to supply part of the required alkalinity. It cannot, however, be used to the exclusion of quicklime and still obtain satisfactory stability. The described proportions of quicklime are required to insure adequate stability. In addition to supplementing the supply of alkalinity, the hydrated lime desirably increases and stabilizes the viscosity of the resulting standard slurries. It is preferably finely divided and must be used in proportions of about 1 to 10 weight per cent. More than about 10 per cent of hydrated lime appears to decrease the effectiveness of the composition when applied dry to contaminated surfaces and also adversely affects the wettability of the mixture in the preparation of the slurry.

Calcium carbonate preferably in the form of precipitated chalk, rather than whiting which is a pulverized material, provides an adequate viscosity in the slurry without adding further alkalinity or decreasing the wettability of the mixture. It also furnishes reserve but not free alkalinity for neutralization of the acid formed by decomposition of mustard gas. Other inorganic water-insoluble alkaline buffers in a finely divided state may be substituted in whole or in part for the calcium carbonate. Examples of suitable materials are substantially anhydrous magnesium oxide, magnesium carbonate, calcium silicate and alumina. The buffer must be inert with respect to hypochlorite and in a sufficiently finely divided state to provide adequate viscosity in the slurry without adversely affecting the set point. Not less than about 20 per cent and up to about 50 per cent of calcium carbonate or its equivalent is preferred because of its desirable characteristics in neutralizing the decomposition products of mustard gas.

The soda ash serves to precipitate calcium carbonate in the mixture and thus increase the viscosity of the slurry more than the inclusion of an equivalent amount of chalk. In addition, this component decreases the tendency of the slurry to develop foam on standing. However, the use of more than about 10 weight per cent of this component results in slurries having viscosities too high to be sprayed successfully. Soda ash is preferred although other water soluble salts of an alkali metal and an anion the calcium salt of which is produced as a water insoluble precipitate may be used. For example, anhydrous sodium metasilicate or trisodium phosphate may be substituted in whole or in part for the soda ash. These materials improve viscosity due to the flocculent nature of their calcium precipitates. Sodium sulfate is unsatisfactory because the precipitated calcium sulfate is coarsely granular and objectionable.

The sodium chloride component removes or reduces the thixotropic tendency otherwise exhibited by the slurry. It is the principal ingredient effective in reducing the set point of the mixture to about —20° C. More than about 10 weight per cent of salt, however, tends to reduce the viscosity of the slurry. It is preferably finely divided and may desirably contain a minor proportion of tricalcium phosphate to prevent caking.

The composition of my invention will be further described by reference to the following example.

*Example*

A composition was prepared by mixing together the following ingredients in powdered form and in the proportions shown:

| Component: | Parts by weight |
|---|---|
| Calcium hypochlorite | 42 |
| Quicklime | 7 |
| Hydrated lime | 5 |
| Precipitated chalk | 26 |
| Light soda ash | 10 |
| Salt | 10 |
| Total | 100 |

The calcium hypochlorite was "HTH," a commercially available hypochlorite, and contained 70 per cent available chlorine. It passed a 60 mesh screen. The quicklime contained 93.5 per cent active calcium oxide and 95 per cent passed a 325 mesh screen. The hydrated lime was a high calcium chemically pure grade material. The calcium carbonate was a precipitated chalk containing 98.4 per cent calcium carbonate and 99.4 per cent passed a 300 mesh screen. The light soda ash was of high quality guaranteed 58 per cent sodium oxide. The salt was a commercial product known as "prepared fines" containing a minor proportion of tricalcium phosphate to prevent caking.

The composition of this example contained 29.4 per cent available chlorine. When a sample was spread out in a Petri dish to a depth of $1/16$ inch and exposed (without cover) to direct sunlight for hour hours, the available chlorine lost was only 1 per cent of the available chlorine content of the original material. Acceptable material must show not over 20 per cent loss.

In one test of wettability a solution of 2 grams of citric acid in 600 ml. of water at 20° C. was placed in a 1000 ml. beaker and 400 grams of the above described hypochlorite composition was added. The mixture was stirred by hand with a rod until all the solid was wetted. This required only 5 seconds while as much as 45 seconds is permissible.

To determine the properties of the standard slurry of the above described material, 1400 grams was added to a solution of 7 grams of citric acid in 2100 ml. of water at 25° C. The mixture was contained in a one gallon Dewar flask fitted with an electric stirrer and cork cover. The mixture was stirred until a smooth slurry was obtained and a sample was removed for analysis of the original available chlorine content. The slurry was then allowed to stand quietly for 24 hours. The temperature of the slurry immediately after the mixing was only 40° C. compared to a maximum permissible temperature of 50° C. After standing for 24 hours no foam appeared on the slurry whereas a foam layer of ¼ inch in thickness is permissible. The slurry was again stirred until smooth and a sample removed for analysis of available chlorine content. During the 24 hours a loss based on the original available chlorine content of only 4 per cent was found whereas a loss of up to 20 per cent is permissible.

To determine the set point a smooth slurry was prepared by stirring 400 grams of the above described hypochlorite composition with 600 ml. of water containing dissolved therein 2 grams of citric acid (U. S. P. monohydrate). Approximately 30 ml. of the slurry was stirred slowly with a thermometer while cooling in a Dry Ice-acetone bath at the rate of 1 to 2° C. per minute. The mixture required cooling to —20° C. in order to prevent loss of slurry when the beaker was inverted for one minute. This is a satisfactory performance.

The apparent viscosity of the slurry at 25° C. was measured by the time in seconds required for 50 ml. of the slurry prepared as described above to flow through a standard funnel. The standard funnel was a 60° Pyrex filter funnel having a stem cut off square at a length of $14.5 \pm 0.1$ cm. The stem has an average inside diameter of $0.165 \pm 0.005$ inch and the capacity of the funnel including the stem is 240 ml. The slurry prepared from the composition described above required 6 seconds in this test which is a satisfactory apparent viscosity.

Each of the ingredients of the composition of my invention has a specific purpose in meeting the performance requirements of decontaminating compositions. No diluent is present. Moreover, the proportions described, both in upper and lower limits, must be observed in order to provide a satisfactory product. The compositions have stability equal or superior to previously used supertropical bleach in both dry and slurry form. The wettability and tendency to form lumps of objectionable size in the slurry are significantly improved. The viscosity of the standard slurry is within prescribed limits and does not increase on standing beyond the defined value. The composition is extremely effective in decontaminating areas, structures and articles contaminated by mustard gas, particularly when used in slurry form. In addition, it is effective when used in dry form. The latter is especially important where facilities for making up the slurry are not available or when time does not permit.

I claim:

1. A powdered composition useful in mustard gas decontamination which consists essentially of about 40 to 45 weight per cent of calcium hypochlorite of at least about 70 percent available chlorine content, about 5 to 12 weight per cent of quicklime, about 1 to 10 weight per cent of hydrated lime, about 20 to 50 weight per cent of hypochlorite-inert, water insoluble inorganic alkaline buffer, about 1 to 10 weight per cent of a water soluble salt of an alkali metal and an anion the calcium salt of which is water insoluble, and about 1 to 10 weight per cent of sodium chloride.

2. The composition of claim 1 in which the buffer is calcium carbonate.

3. The composition of claim 2 in which the water soluble salt is sodium carbonate.

4. The composition of claim 1 in which the water soluble salt is sodium carbonate.

5. The composition of claim 1 in which the water soluble salt is sodium metasilicate.

6. The composition of claim 1 in which the water soluble salt is trisodium phosphate.

References Cited in the file of this patent

UNITED STATES PATENTS

| | | |
|---|---|---|
| 1,894,207 | Taylor | Jan. 10, 1933 |
| 1,945,913 | Remele | Feb. 6, 1934 |
| 2,242,315 | MacMahon | May 20, 1941 |
| 2,589,108 | Mark | Mar. 11, 1952 |